United States Patent Office 2,787,981
Patented Apr. 9, 1957

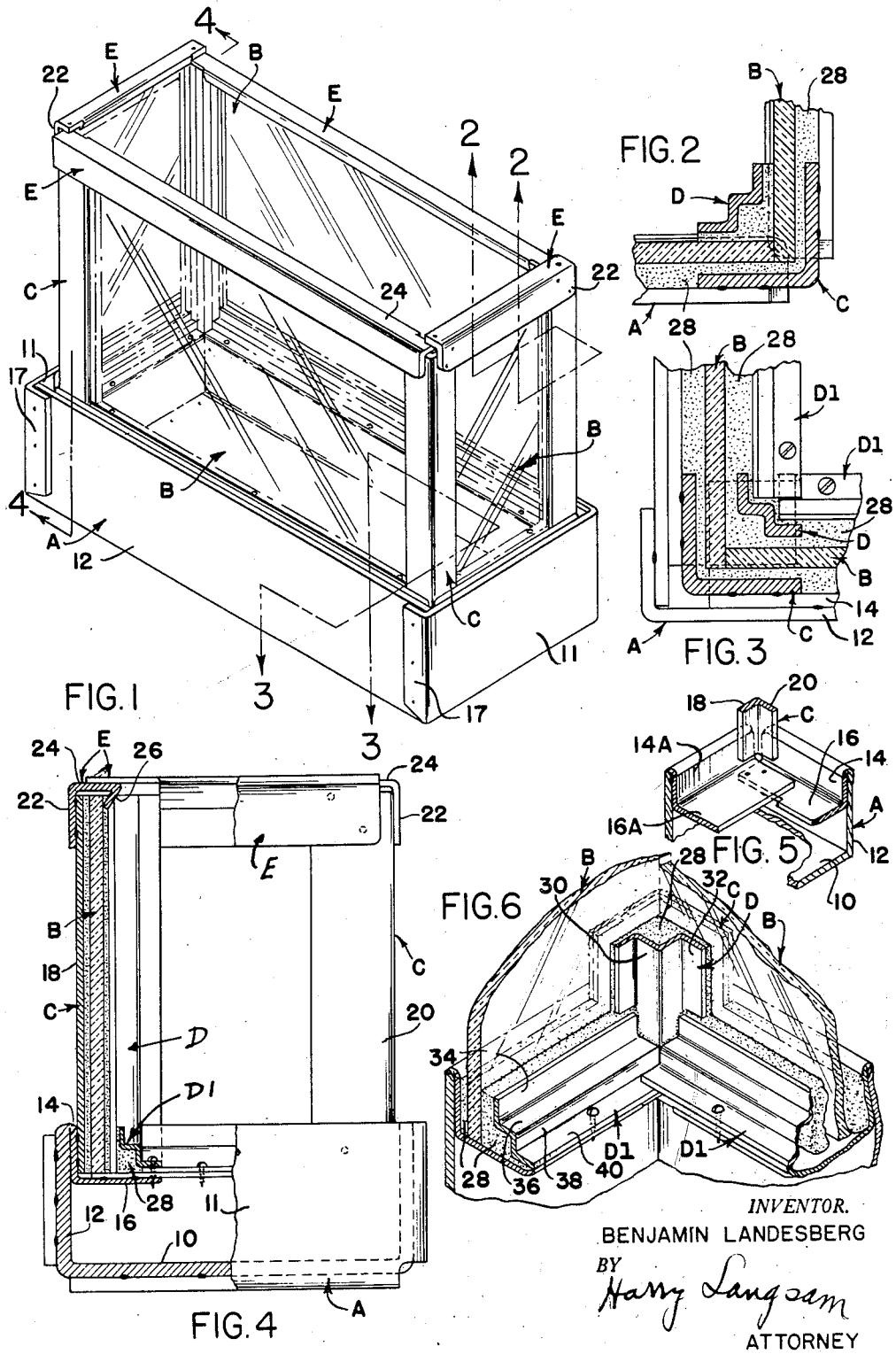

2,787,981

AQUARIUM

Benjamin Landesberg, Philadelphia, Pa., assignor to Landes Mfg. Co., a partnership Application December 29, 1954, Serial No. 478,427

1 Claim. (Cl. 119—5)

My invention relates to an aquarium and relates particularly to an aquarium whose sides are partially of metal and partially of transparent panels.

An object of my invention is to provide a panel wherein the bottom, which may hold suitable filtering materials, will not be apparent to one viewing the marine life within the aquarium.

Another object of my invention is to provide an aquarium wherein the bottom and a portion of the side walls are integrally formed together, and wherein a flange formed with the side supports the transparent panels.

It is another object of my invention to provide an aquarium wherein the parts may be quickly assembled and readily disassembled and the transparent panels may be readily taken apart.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings, in which:

Fig. 1 is a perspective view of an aquarium embodying my invention.

Fig. 2 is an enlarged sectional view taken along the line 2—2 of Fig. 1.

Fig. 3 is an enlarged sectional view taken along the line 3—3 of Fig. 1.

Fig. 4 is an enlarged fragmentary sectional view taken along the line 4—4 of Fig. 1.

Fig. 5 is an enlarged fragmentary view of the corner post and the inwardly projecting flange.

Fig. 6 is an enlarged fragmentary view of the completely assembled corner post, metal molding, and the caulking compound, as well as the plastic compound holding the transparent panels in place and making the junction of the panel and the flange watertight.

Referring now in greater detail to the drawing, wherein similar reference characters refer to similar parts, I show a fish aquarium embodying my invention.

My fish aquarium is a liquid containing tank for holding aquatic marine life and comprises a sheet metal lower section, generally designated as A, and an upper transparent enclosure, generally designated as B.

The lower section A is formed from a single sheet metal stamping and comprises a bottom 10, a pair of vertical end walls 11 at right angles to the bottom and a pair of vertical side walls 12 at right angles to both the bottom and end walls to define four trihedral corners.

Each of the side walls 12 has an interior upper portion 14 which is folded parallel to and abuts the side wall itself. The interior upper portion 14 terminates in a horizontal flange 16 which extends inwardly at right angles to the side wall and is adapted to support vertically extending transparent panels B of the upper enclosure. Each of the end walls 11 has a pair of flaps 17 which is rigidly secured by spot welding to the end of the adjacent side wall 12. Each of the end walls 11 has, in addition, an upper interior portion 14A which is folded parallel and abuts the upper portion of the end wall itself. The upper portion 14A is further folded to for a horizontal end wall flange 16A which extends inwardly at right angles to the end wall 11.

The adjacent ends of the horizontal side wall flanges 16 and the end wall flanges 16A overlap and are secured to each other by spot welding to form four trihedral support corners with the interior portions of adjacent side and end walls. These trihedral support corners provide a foundation for vertically disposed corner posts, generally designated as C.

The corner posts C are angle members having legs 18 and 20 which support adjacent edges of the transparent panels B in rectangular configuration. These panels B may be made of glass or suitable plastic. The bottom edges of the corner posts C are supported within a respective trihedral support corner while the panels B are supported upon the inwardly projecting horizontal wall flanges 16 and 16A.

A horizontally extending angle member or bezel, generally designated as E, joins the upper ends of the vertical post C, and also provides a lateral support for the transparent panel B. The horizontally extending metal molding E, or bezel, has a vertical leg 22, a horizontal leg 24, and downturned lip 26. The vertical leg 22 is adapted to abut against the upper portion of the corner posts C, and the lip 26 is adapted to abut in contact with the transparent panel B.

The transparent panels B are sealed along their adjacent vertical edges by sandwiching a layer of mastic 28 between the corner posts C and a W-shaped molding strip, generally designated as D. A bead of mastic is laid at the interior portion of the juncture of two panels, the mastic being supported by the molding strip D as will be more fully described herein below.

Each of the molding strips D comprises a pair of laterally extending arms 32 integrally formed at right angles to one another by a laterally extending right angle step 30 molding strips D1 are set in a horizontal position and are also W-shaped in cross-section wherein a pair of laterally extending arms 34 and 40 at right angles to one another integrally extend from a laterally extending right angle step having members 36 and 38.

A layer of mastic 28 is laid between the anterior base of the panels B and the interior upper portions 14 and 14A of the end and side walls and a bead of mastic is laid between the molding strips D1 and the interior base portion of the panels B. The panels D1 are permanently affixed to the horizontal flanges 16 and 16A along the arms 40 by suitable means such as by riveting or bolting. It is to be herein noted that mastic is sandwiched between the arms 40 and the flanges 16 and 16A along the entire length of the molding strips. It is to be further noted that the ends of the horizontal molding strips D1 abut one another at each of the trihedral support corners and define a pyramidal corner having tri-planar steps with the end of a vertical molding strip D. Thus, a seam of mastic is sandwiched between each of the molding strips and its adjacent surfaces to provide a seal along the entire lower internal periphery of the panels B, along the juncture of the abutting edges of the panels and at the corners of the upper enclosure where it is set within the lower section A.

The inside vertical molding post D has mastic 28 between its legs 30, 32 to seal the juncture of the transparent panels B. The inside horizontally extending molding posts D1, similar in construction to post D, has legs 34, 36, 38, and 40 between which is laid mastic 28.

Although my invention has been described in considerable detail, such description is intended as being illustrative rather than limiting, since the invention may be variously embodied, and the scope of the invention is to be determined as claimed.

I claim as my invention:

A liquid containing tank for holding aquatic marine life comprising a lower section, and an upper transparent enclosure, said lower section comprising a bottom, a pair of vertical end walls extending at right angles thereto and a pair of vertical side walls at right angles to said bottom and said end walls to define four trihedral corners, each of said side walls having an interior upper portion which is parallel to and abutting the side wall itself, the interior upper portion of said side walls having a horizontal side wall flange extending inwardly at right angles thereto, a pair of end flaps on said end walls being parallel and rigidly secured to said side walls, each of said end walls having an interior upper portion which is parallel to and abutting the end wall itself and having a horizontal end wall flange extending inwardly at right angles to said end wall, the adjacent ends of said horizontal side wall and end wall flanges overlapping and being permanently secured to each other to form four trihedral support corners with the interior portions of adjacent side and end walls for said upper transparent enclosure, said upper transparent enclosure comprising a pair of transparent side panels and a pair of transparent end panels, said transparent side and end panels being supported in rectangular configuration at adjacent edges by four vertically disposed corner posts, the bottom edges of said corner posts being supported within a respective trihedral support corner, and the bottom edge of each of said transparent panels being supported upon said inwardly projecting horizontal wall flanges, the upper edges of said transparent panels being enclosed by a horizontally extending bezel, said bezel comprising a plurality of angle members, each being secured to a pair of vertical posts, W-shaped molding strips secured to said vertical posts and to said inwardly projecting horizontal wall flanges, each of said molding strips comprising a pair of laterally extending arms being integrally formed at right angles to one another by a laterally extending right angle step, the ends of said molding strips abutting one another at each of said trihedral support corners to define four pyramidal corners having triplanar steps intersecting at right angles to each other, and a seam of mastic sandwiched between each of said molding strips and its adjacent surfaces.

References Cited in the file of this patent
UNITED STATES PATENTS

| | | |
|---|---|---|
| 2,002,380 | Wernicke et al. | May 21, 1935 |
| 2,178,117 | Hillenek | Oct. 31, 1939 |
| 2,713,847 | Blaise | July 26, 1955 |